United States Patent
Houzenga et al.

(10) Patent No.: US 7,523,271 B2
(45) Date of Patent: Apr. 21, 2009

(54) APPARATUS, SYSTEM, AND METHOD FOR REGULATING THE NUMBER OF WRITE REQUESTS IN A FIXED-SIZE CACHE

(75) Inventors: Matthew B. Houzenga, Tucson, AZ (US); Alan G. McClure, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 11/324,592

(22) Filed: Jan. 3, 2006

(65) Prior Publication Data
US 2007/0156961 A1 Jul. 5, 2007

(51) Int. Cl.
G06F 12/00 (2006.01)
G06F 13/00 (2006.01)
G06F 13/28 (2006.01)

(52) U.S. Cl. .......................... 711/151; 710/39
(58) Field of Classification Search .................. 710/39; 711/151
See application file for complete search history.

(56) References Cited

U.S. PATENT DOCUMENTS

| | | | |
|---|---|---|---|
| 5,418,929 A * | 5/1995 | Tsuboi et al. ............... 711/171 |
| 6,023,720 A * | 2/2000 | Aref et al. ................... 718/103 |
| 6,085,277 A | 7/2000 | Nordstrom et al. .......... 710/263 |
| 6,336,143 B1 | 1/2002 | Diedrich et al. ............. 709/231 |
| 6,434,161 B1 | 8/2002 | Higbee et al. ................ 370/413 |
| 6,643,263 B1 | 11/2003 | Blomgren et al. ........... 370/236 |
| 6,654,343 B1 | 11/2003 | Brandis et al. .............. 370/229 |
| 6,871,011 B1 * | 3/2005 | Rahman et al. ............. 386/125 |
| 7,222,223 B2 * | 5/2007 | Miller et al. ................ 711/158 |
| 2004/0255055 A1 * | 12/2004 | Lamberts ....................... 710/5 |
| 2005/0169066 A1 * | 8/2005 | Kawashima et al. ... 365/189.05 |
| 2006/0095686 A1 * | 5/2006 | Miller et al. ................ 711/151 |

* cited by examiner

Primary Examiner—Pierre-Michel Bataille
Assistant Examiner—Edward J Dudek
(74) Attorney, Agent, or Firm—Kunzler & McKenzie (57) ABSTRACT

An apparatus, system, and method are disclosed for regulating the number of write requests in a fixed-size cache that facilitates differentiated treatment of write requests based on an assigned pacing value. The apparatus includes an examination module to examine a pending write request issued by an application. A priority module determines a priority for the write request based on an operating system defined input/output priority value. An assessment module assesses a storage demand level for storing write requests in a fixed-size cache. An assignment module assigns a pacing value to the write request based on the priority and in response to the storage demand level. A permission module permits the application to issue a subsequent write request once the pacing value of the write request is satisfied. The pacing value is satisfied by waiting until the amount of time specified by the pacing value expires.

16 Claims, 6 Drawing Sheets

Examination Module
302

Priority Module
304

Assessment Module
306

Assignment Module
308

Permission Module
310

FIG. 3

|  | 104 | 106 | 408 |
|---|---|---|---|
|  |  |  |  |
|  |  |  |  |
|  |  |  |  |
|  |  |  |  |
| 404 → | Application B | Volume 1 | Priority 4 |
| 406 → | Application C | Volume 3 | Priority 3 |
| 404 → | Application B | Volume 1 | Priority 4 |
| 404 → | Application B | Volume 1 | Priority 4 |
| 404 → | Application B | Volume 1 | Priority 4 |
| 402 → | Application A | Volume 6 | Priority 1 |

|  | 104 | 106 | 408 |
|---|---|---|---|
|  |  |  |  |
|  |  |  |  |
|  |  |  |  |
|  |  |  |  |
| 432 → | Application C | Volume 1 | Priority 2 |
| 432 → | Application B | Volume 1 | Priority 2 |
| 434 → | Application A | Volume 3 | Priority 2 |
| 434 → | Application A | Volume 3 | Priority 2 |
| 432 → | Application B | Volume 1 | Priority 2 |
| 432 → | Application C | Volume 1 | Priority 2 |

|  | 104 | 106 | 408 |
|---|---|---|---|
|  |  |  |  |
|  |  |  |  |
|  |  |  |  |
|  |  |  |  |
| 462 → | Application A | Volume 1 | Priority 1 |
| 462 → | Application C | Volume 1 | Priority 1 |
| 464 → | Application B | Volume 1 | Priority 4 |
| 464 → | Application B | Volume 1 | Priority 4 |
| 462 → | Application A | Volume 1 | Priority 1 |

FIG. 4C

| Priority | Pacing Value |
|---|---|
| FF | 0 ms |
| FE | 100 ms |
| FD | 200 ms |
| FC | 300 ms |
| FB | 400 ms |
| FA | 500 ms |
| F9 | 600 ms |
| F8 | 700 ms |

FIG. 5A

| Priority | Pacing Value |
|---|---|
| FF | 0 ms |
| FE | 500 ms |
| FD | 500 ms |
| FC | 500 ms |
| FB | 500 ms |
| FA | 500 ms |
| F9 | 500 ms |
| F8 | 500 ms |

FIG. 5B

| Priority | Pacing Value |
|---|---|
| FF | 0 ms |
| FE | 0 ms |
| FD | 0 ms |
| FC | 0 ms |
| FB | 500 ms |
| FA | 500 ms |
| F9 | 500 ms |
| F8 | 500 ms |

APPARATUS, SYSTEM, AND METHOD FOR REGULATING THE NUMBER OF WRITE REQUESTS IN A FIXED-SIZE CACHE

BACKGROUND OF THE INVENTION

1. Field of the Invention

This invention relates to caching of write requests and more particularly relates to regulating the number of write requests in a fixed-size cache.

2. Description of the Related Art

Nearly all computer software applications store information. Software applications store information on a volatile or non-volatile storage volume such as a hard disk, tape drive, solid state memory device, or other storage device. In some computer systems, the storage volume is part of the same machine on which the software application is executing. In other computer systems the storage volume is physically separated from the application. In these systems, a bus or network connects the software application and storage volume and enables communication between the software application and the storage volume.

Often, when the storage volume is physically separated from the application, multiple applications have access to a single storage volume and may try to write information to the storage volume at the same time. As a result, an application may try to write information to a storage volume while the storage volume is busy accommodating a write request from another application. Consequently, storage volumes can not always execute write requests immediately after receiving them.

A conventional approach to this problem is to store write requests in a cache until the storage volume can execute the write requests. Typically, the cache stores write requests in the order they are received. Write requests are taken from the cache, typically in the order they were received, and executed as the storage volume becomes available. Conventionally, the cache is physically located on the same machine as the application.

Caching write requests is effective as long as there is room in the cache for write requests. However, conventional caches are typically of a fixed size, these fixed-size caches can fill up with write requests during particularly busy periods of time. Once the write request cache fills up, additional write requests cannot be accepted from applications. Consequently, applications need to wait until the cache has free space and then re-submit write requests.

Figure 1A:
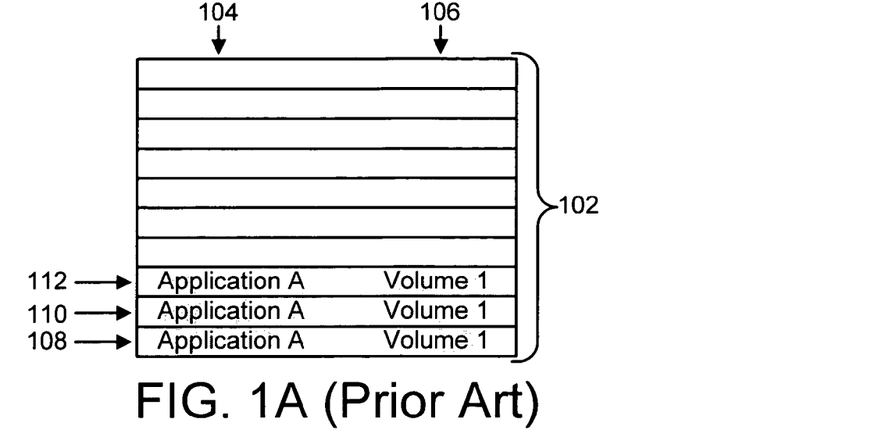
FIG. 1A is a chart illustrating the contents of an example write request cache.

FIG. 1A is a chart illustrating the contents of an example cache 100. The example cache 100 has ten write request slots 102. Each slot 102 can store one write request. Of course, actual caches typically store hundreds, thousands, or more entries. The example cache 100 illustrated has ten write request slots 102 for simplicity.

Each write request can include information such as the name of the application making the request, the storage volume on which information is to be stored, a pointer to the data to be written or the data itself, and the like. The example cache 100 illustrates the name 104 of the application making the write request and the storage volume 106 on which information is to be written.

The example cache 100 contains three write requests 108, 110, 112. "Application A" submitted all three write requests 108, 110, 112. In this example, "Application A" is an application that records critical temperature data every 100 milliseconds. In this example, the operators of the storage volume have a service level agreement with the operators of "Application A" specifying that the storage volume operator will ensure that all write requests issued by "Application A" will be written on the storage volume without requiring "Application A" to wait, commonly referred to as blocking.

The example cache 100 stores write requests in their order of arrival with the oldest write request at bottom of the cache and the most recent write request at the top of the cache. The first write request 108 made by "Application A" is the next write request to be executed. The second write request 110 made by "Application A" will be executed after the first write request 108. Likewise, the third write request 112 will be executed after the second write request 110 has been executed.

Figure 1B:
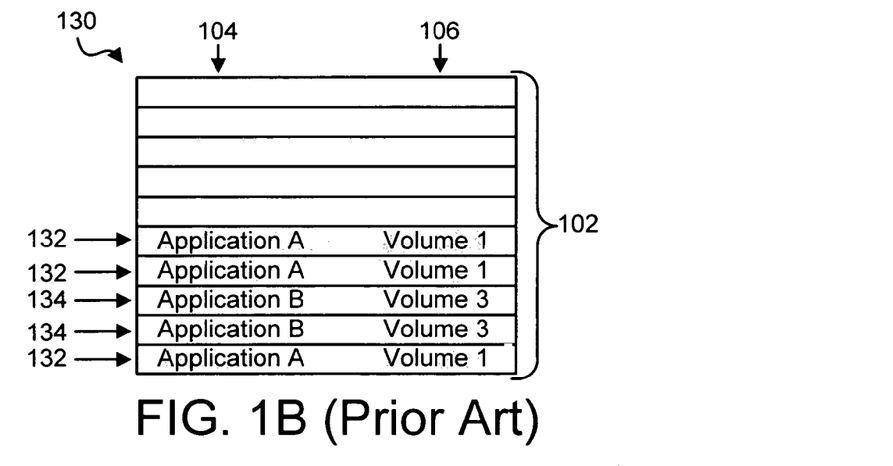
FIG. 1B is a chart illustrating the contents of an example write request cache.

FIG. 1B is a chart illustrating the contents of an example write request cache 130 accommodating write requests from two applications. "Application A" sends periodic write requests to record temperature data every 100 milliseconds. In contrast, "Application B" sends bursts of write requests at irregular intervals. In this example, the cache 130 has room for both "Application A" write requests 132 and a small burst of "Application B" write requests 134.

Figure 1C:
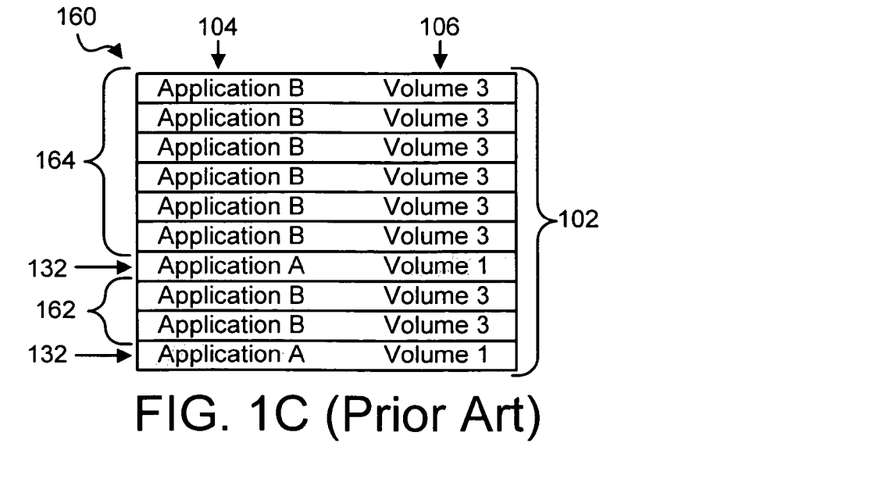
FIG. 1C is a chart illustrating the contents of an example write request cache.

FIG. 1C is a chart illustrating the contents of an example write request cache 160. In this example cache 160, all available write request slots 102 have been filled by periodic "Application A" write requests 132 and two bursts 162,164 of "Application B" write requests. Consequently, the cache is full and there is no room for a subsequent critical "Application A" write request. Consequently, the next "Application A" write request may be dropped or delayed, resulting in a violation of the service level agreement between the operators of "Application A" and the operators of the service volume.

Some conventional systems reduce the likelihood of this overflow problem by implementing write request pacing. Write request pacing slows the rate of write requests entering the cache by forcing applications to delay write requests. However, conventional methods of pacing are very restrictive because they lack granularity. Conventional pacing methods assign the same pacing value to all write requests. Conventional methods of pacing slow the rate of all write requests in the cache and are unable to distinguish between high priority write requests and low priority write requests. In addition, conventional methods of pacing are unable to distinguish the write requests in the cache by their destination storage volume. Instead, when pacing is enabled all write requests in the cache are treated in the same manner.

From the foregoing discussion, it should be apparent that a need exists for an apparatus, system, and method for regulating the number of write requests in a fixed-size cache. The apparatus, system, and method should ensure that there is room in the cache for critical write requests by delaying non-critical write requests. Additionally, the apparatus, system, and method should provide a way to pace write requests based on their priority and their destination storage volume.

SUMMARY OF THE INVENTION

The present invention has been developed in response to the present state of the art, and in particular, in response to the problems and needs in the art that have not yet been fully solved by currently available cache regulation methods. Accordingly, the present invention has been developed to provide an apparatus, system, and method for regulating the number of write requests in a fixed-size cache that overcome many or all of the above-discussed shortcomings in the art.

The apparatus for regulating the number of write requests in a fixed-size cache is provided with a logic unit containing a plurality of modules configured to functionally execute the steps of regulating the number of write requests in a fixed-size cache. These modules in the described embodiments include an examination module, a priority module, an assessment module, and an assignment module.

The examination module examines a pending write request issued by an application. The priority module determines a priority for the write request based on an associated input/output priority value which may be defined by an operating system. The assessment module assesses a storage demand level for storing write requests in a fixed-size cache by counting the number of write requests stored in the fixed-size cache that are associated with a particular set of storage volumes. The assessment module then compares the count with a threshold.

If the count is above the threshold, the assignment module assigns a pacing value to the write request based on the priority determined by the priority module. The pacing value is an amount of time between substantially zero milliseconds and substantially five seconds. In one embodiment, the assignment module assigns a first pacing value to a write request with a first priority and assigns a second pacing value to a write request with a priority different from the first priority. In another embodiment, the assignment module assigns a pacing value to the write request based on a one-to-one mapping between a set of priorities and a set of pacing values.

The permission module permits the application to issue a subsequent write request once the pacing value associated with the original request has been satisfied. The pacing value is satisfied by waiting until the amount of time specified by the pacing value expires.

A system of the present invention is also presented for regulating the number of write requests in a fixed-size cache. The system, in one embodiment, includes a fixed-size cache, an application, at least one storage volume, a first communication bus, a second communication bus, and a storage controller. The fixed-size cache stores write requests. The application issues write requests. In one embodiment, the application withholds subsequent write requests until the storage controller acknowledges an original write request.

The storage volume stores the data specified by a write request. The first communication bus facilitates communication between the fixed-size cache and the storage volume. The second communication bus facilitates communication between the application, storage controller, and fixed-size cache. The storage controller includes an examination module, a priority module, an assessment module, an assignment module, and a permission module.

The examination module examines a write request generated by the application. The priority module determines a priority for the write request based on a characteristic of the write request. In one embodiment, the characteristic is an input/output priority value defined by an operating system.

The assessment module assesses a storage demand level for storing write requests in the fixed-size cache. In one embodiment, the assessment module assesses the storage demand level by comparing a rate of write requests received by the fixed-size cache to a threshold. In another embodiment, the assessment module determines the storage demand level by comparing a count of write requests associated with a particular set of storage volumes stored in the fixed-size cache with a threshold.

The assignment module assigns a pacing value to the write request based on the priority if the storage demand level is above a threshold. In one embodiment, the pacing value is an amount of time between substantially zero milliseconds and substantially five seconds. The pacing value, in this embodiment, is satisfied by waiting until the amount of time specified by the pacing value expires. In another embodiment, the pacing value comprises a predetermined percentage of fixed-size cache occupancy. In this embodiment, the pacing value is satisfied when a current percentage of fixed-size cache occupancy is less than the predetermined percentage of fixed-size cache occupancy.

In one embodiment, the assignment module assigns a first pacing value to a write request with a first priority and assigns a second pacing value to a write request with a priority different from the first priority. In another embodiment, the assignment module assigns a pacing value to the write request based on a one-to-one correspondence between a set of priorities and a set of pacing values. The permission module permits the application to issue a subsequent write request once the pacing value of the original write request has been satisfied.

A method for regulating the number of write requests in a fixed-size cache is also provided. The method in the disclosed embodiments substantially includes the steps necessary to carry out the functions presented above with respect to the operation of the described apparatus and system.

A priority is determined for a write request generated by an application based on a characteristic of the write request. A storage demand level for storing write requests in a fixed-size cache is assessed. A pacing value is assigned to the write request based on the priority and in response to the storage demand level. The application is permitted a subsequent write request once the pacing value of the original write request has been satisfied.

The apparatus, system, and method regulate the number of write requests in the fixed-size cache according to the priority of the write request. The apparatus, system, and method reduce the possibility that the fixed-size cache will be full by delaying acknowledgement of write requests according to a pacing value assigned to each write request. These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 2:
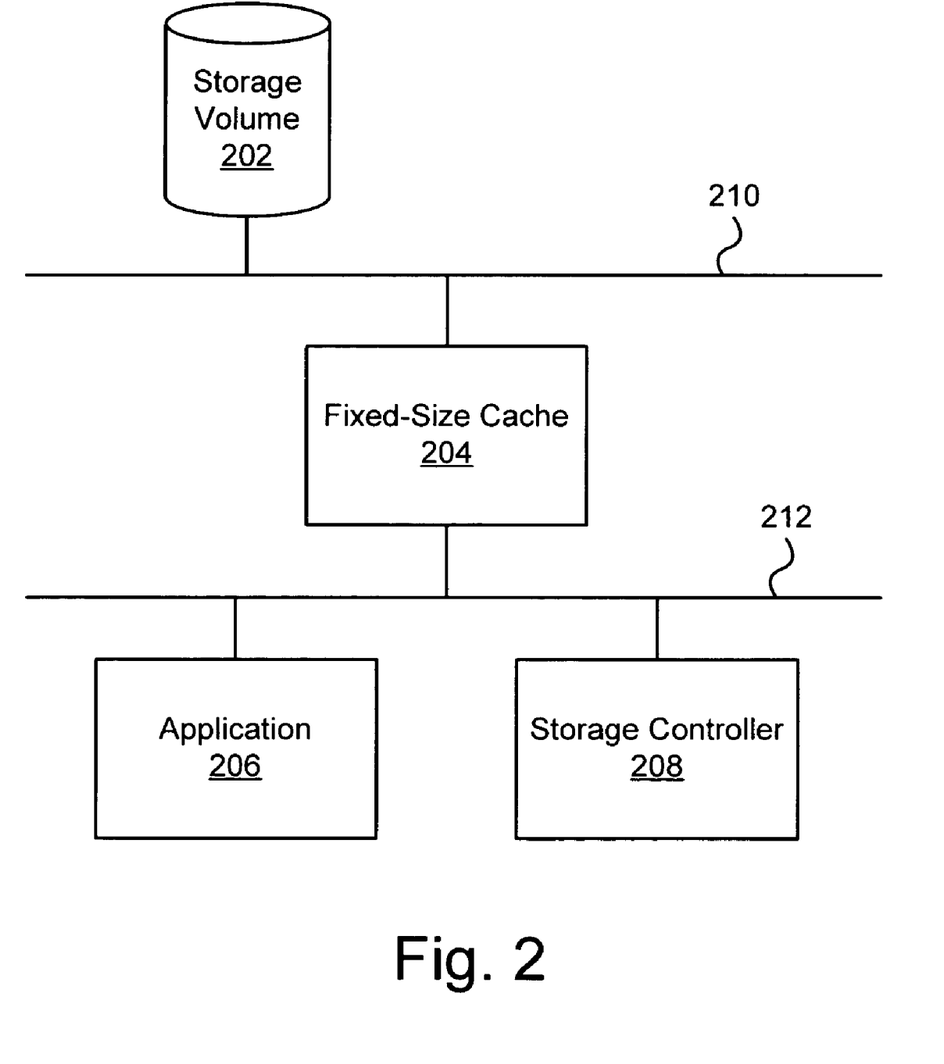
FIG. 2 is a block diagram illustrating one embodiment of a system for regulating the number of write requests in a fixed-size cache in accordance with the present invention.

FIG. 2 illustrates one embodiment of a system 200 for regulating the number of write requests in a fixed-size cache 204. The system 200 includes at least one storage volume 202, a fixed-size cache 204, an application 206, a storage controller 208, a first communication bus 210, and a second communication bus 212. Those of skill in the art will recognize that the system 200 may be more simple or complex than illustrated so long as the system 200 includes modules or sub-systems that correspond to those described herein.

The fixed-size cache 204 stores write requests issued by the application 206. The fixed-size 204 cache may comprise volatile or non-volatile memory such as solid state memory, a disk drive, and the like. The fixed-size cache 204 may store a fixed number of write requests. The fixed-size cache 204 may store write requests issued by a plurality of applications 206 for a plurality of storage volumes 202.

The application 206 issues requests to write data onto the storage volume 202. The write requests are stored in the fixed-size cache 204 before being executed (written to the storage volume 202). The system 200 may include a plurality of applications 206, each sending write requests to the fixed-size cache 204. The application 206 may issue write requests periodically, or the application 206 may issue write requests randomly. The application 206 may issue one write request at a time or may issue bursts of write requests within a short period of time. The application 206 may be substantially any software program that saves data on a storage volume 202. In one embodiment, the application 206 withholds subsequent write requests until the storage controller 208 acknowledges an original write request.

The storage volume 202 provides storage of data. In particular, the storage volume 202 stores data specified by a write request issued by the application 206. The storage volume 202 may be a Direct Access Storage Device (DASD), a disk drive, a tape drive, solid state memory, or other memory whether volatile or non-volatile. In one embodiment, the system 200 includes a plurality of storage volumes 202. An administrator may organize the plurality of storage volumes 202 into subsets of related storage volumes.

The first communication bus 210 operatively couples the storage volume 202 and the fixed-size cache 204 and facilitates communication between the fixed-size cache 204 and the storage volume 202. The second communication bus 212 operatively couples the fixed-size cache 204, the application 206, and the storage controller 208 and facilitates communication between the fixed-size cache 204, the application 206, and the storage controller 208.

The first and second communication buses 210,212 may be a bus, a wired network, a wireless network, or other connective communication technology. The first and second communication buses 210,212 may employ the use of multiple, layered communication protocols including Ethernet, Internet Protocol (IP), Asynchronous Transfer Mode (ATM), Time Division Multiplexing (TDM), Peripheral Communication Interface (PCI), Small Computer System Interface (SCSI), Internet Small Computer System Interface (iSCSI), and the like.

In one embodiment, the storage controller 208 utilizes an Extended Remote Copy (XRC) protocol to relay write requests from the fixed-size cache 204 to the storage volume 202. When the fixed-size cache 204 and the storage volume 202 are located in the same cabinet, the first communication bus 210 is typically a bus. Alternatively, when the fixed-size cache 204 and the storage volume 202 are physically separated, by a as little as a few feet or as much as thousands of miles, the first communication bus 210 is typically a network. In another embodiment, the first communication bus 210 and second communication bus 212 are connected and facilitate communication between the storage volume 202, fixed-size cache 204, application 206, and storage controller 208.

The storage controller 208 examines a write request generated by the application 206. The storage controller 208 may examine the write request by reading the write request from the fixed-size cache 204. The write request stored in the fixed-size cache 204 may include an identifier identifying the application 206 that issued the request. The write request may also include an identifier for the storage volume 202 and a location on the storage volume 202 where the write is to be performed. The write request may also include a pointer to the data to be written on the storage volume 202. Alternatively, the write request may include the data to be written on the storage volume 202.

The storage controller 208 determines a priority for the write request based on a characteristic of the write request. In one embodiment, the characteristic is an input/output priority value specified by the operating system used by the application 206. The input/output priority value may also be specified by a service level agreement module of the application or operating system. Alternatively, the application 206 sets the input/output priority value.

The storage controller 208 assesses a storage demand level for storing write requests in the fixed-size cache 204. The storage demand level indicates the current level of demand for space in the fixed-size cache 204. If the storage demand level is below a threshold then there is room in the fixed-size cache 204 for additional write requests and pacing is not required. If the storage demand level is high then there is limited room in the fixed-size cache 204. Consequently, pacing is required to regulate the ability of an application 206 to place additional write requests in the cache, thereby conserving room in the cache 204.

If the storage demand level indicates that pacing is necessary to regulate the number of write requests in the fixed-size cache 204, the storage controller 208 assigns a pacing value to the write request based on the previously determined priority associated with the write request. In one embodiment, the pacing value comprises an amount of time between substantially zero milliseconds and substantially five seconds. The pacing value is satisfied by waiting until the amount of time specified by the pacing value expires. Once the storage controller 208 assigns a pacing value to the write request, the storage controller 208 permits the application 206 to issue a subsequent write request after the pacing value associated with the original write request has been satisfied.

Figure 3:
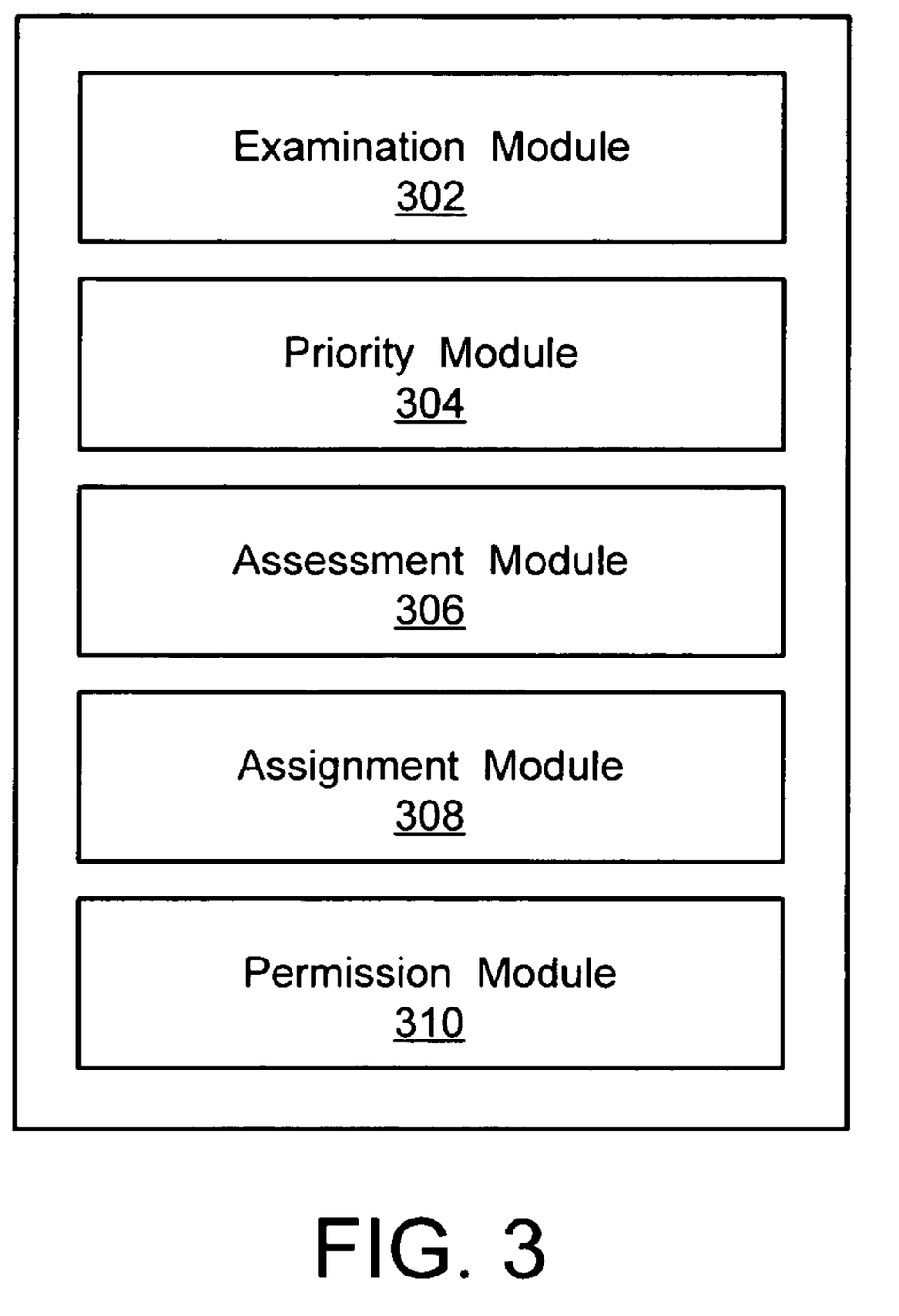
FIG. 3 is a block diagram illustrating one embodiment of an apparatus for regulating the number of write requests in a fixed-size cache in accordance with the present invention.

FIG. 3 illustrates one embodiment of a storage controller 300. Preferably, the storage controller 300 is configured to serve as the storage controller 208 described above in relation to FIG. 2. The storage controller 300 includes an examination module 302, a priority module 304, an assessment module 306, an assignment module 308, and a permission module 310. The examination module 302 examines a write request issued by an application 206. The examination module 302 may examine the write request by reading the write request from the fixed-size cache 204 and parsing the write request into various fields. Alternatively, the examination module 302 may obtain the write request from the application 206.

The priority module 304 determines a priority for the write request based on a characteristic of the write request. The priority may be a numeric, hexadecimal, binary, alphanumeric, or other designator. In one embodiment, the characteristic is an input/output priority value defined by an operating system. For example, the characteristic may be the input/output priority value used in the define extent Channel Command Words (CCW) parameters of the IBM z series operating system (z/OS). The operating system may use the input/output priority value in prioritizing input/output operations in addition to, or separate from, managing of write requests.

The operating system may assign each application 206 that executes within the operating system one of the input/output priority values. Consequently, the operating system assigns all write requests issued by the application 206 the same input/output priority value. In this manner, the operating system gives certain applications priority over other applications for input/output operations. A system administrator may configure the input/output priority value that the operating system gives to each application 206. Alternatively, the application 206 may assign itself an input/output priority value or may request an input/output priority value from the operating system.

The input/output priority value may be a part of the write request, or the operating system may store the input/output priority value in a data structure separate from the write request. If the input/output priority value is stored in a separate data structure, the priority module 304 obtains the input/output priority value for a particular write request from the operating system. If the input/output priority value is part of the write request the priority module 304 parses the write request to obtain the input/output priority.

The characteristic may also be a parameter of the write request. In one embodiment, the application 206 includes a parameter in the write request that indicates the priority of the write request. The application 206 may assign the parameter one value from a set of predefined priority values where the value indicates the relative priority of each write request. The use of the parameter allows the application 206 to issue write requests having a variety of priorities where the priority of each write request is decided by the application 206. The priority module 304 extracts the characteristic from the write request by parsing the write request into various parameters and then inspecting the parameter that indicates the relative priority of the write request.

The characteristic on which the priority is based may also be a service level agreement identifier, an application name, an interrupt priority value, or the like. Once the priority module 304 has used the characteristic of the write request to determine a priority for the write request, the priority module 304 may store the association between the priority and the write request in a data structure so that the assignment module 308 may subsequently use the association in assigning a pacing value.

The assessment module 306 assesses a storage demand level for storing write requests in the fixed-size cache 204. The assessment module 306 assess the storage demand level by determining whether the storage demand level is above, below, or equal to a threshold. The assessment module 306 provides a status of the storage demand level (whether above, below, or equal to the threshold) to the assignment module 308. If the storage demand level is above a threshold the assignment module 308 may assign pacing values to write requests. Alternatively, if the storage demand level is above or equal to the threshold the assignment module 308 may assign pacing values to write requests.

The assessment module 306 may assess, or measure, demand for storing write requests in the fixed-size cache 204 in several different manners. In one embodiment, the assessment module 306 counts the total number of write requests currently stored in the fixed-size cache 204. The assessment module 306 may then compare the count with a threshold.

Figure 4A:
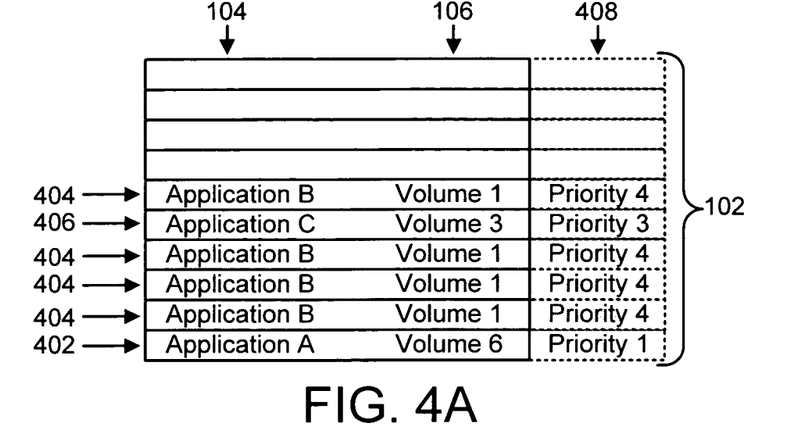
FIG. 4A is a chart illustrating the contents of an example write request cache.

FIG. 4A illustrates the contents of an example fixed-size cache 400. The example fixed-size cache 400 has ten write request slots 102. Of course, typical fixed-size caches may be capable of storing hundreds, thousands, or more write requests. FIG. 4A also illustrates the priority 408 for each write request as determined by the priority module 304. As suggested by the dashed lines in FIG. 4A, the priority 408 may be stored in the fixed-size cache 204 or may be stored in a data structure external to the fixed-size cache 204.

In the example fixed-size cache 400 write requests occupy a total of six write request slots 102. A write request from "Application A" 402 occupies one slot, write requests from "Application B" 404 occupy four slots, and a write request from "Application C" 406 occupies one slot. In one embodiment, the assessment module 306 assesses the storage demand level by counting the total number of write requests in the fixed-size cache 204 without considering which application 206 issued the write requests.

In this example, the count is six. The assessment module 306 then compares the count with a threshold and provides the assignment module 308 with a status of the storage demand level. The status indicates whether the count was below, equal to, or greater than the threshold.

In another embodiment, the assessment module 306 assesses the storage demand level by counting the number of write requests in the fixed-size cache 204 issued by a particular application 206. The assessment module 306 then compares the count with a threshold and provides the assignment module 308 with a status of the storage demand level. In the example fixed-size cache 400 of FIG. 4A, the assessment module 306 may count the number of write requests from "Application A" 402, compare the count to a threshold, and provide a status of the count to the assignment module 308. In a similar manner, the assessment module 306 may determine the status of write requests issued by "Application B" 404 and write requests issued by "Application C" 406.

Figure 4B:
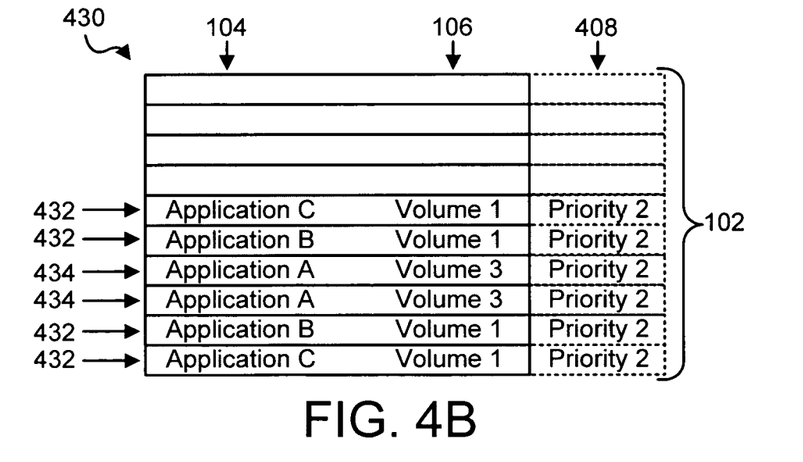
FIG. 4B is a chart illustrating the contents of an example write request cache.

FIG. 4B illustrates the contents of another example fixed-size cache 430. In one embodiment, the assessment module 306 assesses the storage demand level by counting the number of write requests in the fixed-size cache 204 associated with a particular storage volume 202. The assessment module 306 then compares the count with a threshold and provides the assignment module 308 with a status of the storage demand level. In the example fixed-size cache 430 of FIG. 4B, the assessment module 306 may count the number of write requests for "Volume 1" 432, compare the count to a threshold, and provide a status of the count to the assignment module 308. In a similar manner, the assessment module 306 may determine the status of write requests for "Volume 3" 434.

In another embodiment, the assessment module 306 may assess the storage demand level by counting the number of write requests in the fixed-size cache 204 associated with a set of storage volumes 202. For example, in FIG. 4A the assessment module 306 may count all write requests associated with a set of volumes comprising "Volume 1" and "Volume 3" and compare the count with a first threshold. The assessment module 306 could also count all write requests associated with a second set of volumes comprising "Volume 6" and compare the count with a second threshold.

Figure 4C:
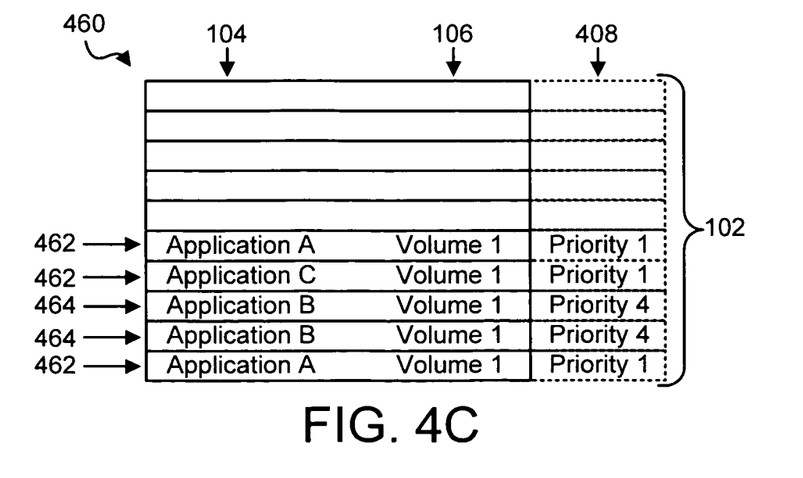
FIG. 4C is a chart illustrating the contents of an example write request cache.

FIG. 4C illustrates the contents of another example fixed-size cache 460. In another embodiment, the assessment module 306 assesses the storage demand level by counting the number of write requests in the fixed-size cache 204 having a particular priority value 408. The assessment module 306 then compares the count with a threshold and provides the assignment module 308 with a status of the storage demand level. In the example fixed-size cache 460 of FIG. 4C, the assessment module 306 may count the number of write requests with "Priority 1" 462, compare the count to a threshold, and provide a status of the count to the assignment module 308. In a similar manner, the assessment module 306 may determine the status of write requests with "Priority 4" 464.

In yet another embodiment, the assessment module 306 assesses the storage demand level by determining the rate at which the application 206 is sending write requests to the fixed-size cache 204. The assessment module 306 may determine the rate by counting the number of write requests issued by the application 206 during a predetermined amount of time.

The assessment module 306 then compares the count with a threshold and provides the assignment module 308 with a status of the storage demand level. The assessment module 306 may also divide the count by the predetermined amount of time to obtain a rate, then compare the rate with a threshold, and provide the assignment module 308 with a status of the storage demand level.

In each of the embodiments of the assessment module 306 described above, the assessment module 306 is supplied with a threshold. Each embodiment of the assessment module 306 may require a different threshold based on the method the assessment module 306 uses to assess the storage demand level. The thresholds may be supplied to the assessment module 306 by a user, a configuration file, an application programming interface (API), a variable, a data structure, or other method well known to those of skill in the art. Alternatively the thresholds may be hard coded as part of the assessment module 306. The thresholds are chosen so that the assignment module 308 and permission module 310 may enable pacing, and thereby slow down write requests, before the fixed-size cache 204 is completely full.

Returning now to FIG. 3, if the storage demand level is above (or in some embodiments above or equal to) the threshold, the assignment module 308 assigns a pacing value to the write request. The pacing value is based on the priority supplied by the priority module 304. The pacing value provides a delay mechanism. Once the assignment module 308 assigns a pacing value to a write request, the permission module 310 does not permit subsequent write requests from the application 206 until after the pacing value has been satisfied.

In one embodiment, the pacing value comprises an amount of time. Satisfaction of this type of pacing value occurs once the amount of time specified by the pacing value expires. The amount of time specified by the pacing value may be between substantially zero milliseconds and substantially five seconds.

In another embodiment, the pacing value comprises a predetermined percentage of fixed-size cache occupancy. Satisfaction of this type of pacing value occurs once the current percentage of fixed-size cache occupancy is less than the predetermined percentage of fixed-size cache occupancy specified by the pacing value. For example, if the pacing value is fifty percent and the current fixed-size cache occupancy is sixty percent, the pacing value is not satisfied. To determine when the pacing value is satisfied the permission module 310 may periodically sample the fixed-size cache occupancy. In this example, once a sampled occupancy is less than fifty percent then the pacing value is satisfied.

The amount of delay introduced by this embodiment of the pacing value is variable, not fixed. The amount of the delay depends on factors such the frequency with which the permission module 310 samples the fixed-size cache occupancy, the number of entries in the fixed-size cache 204 when the pacing value is assigned, the rate at which write requests in the fixed-size cache 204 are executed, and other factors well known to those of skill in the art.

Other pacing values may be used such as a predetermined number of central processing unit (CPU) clock cycles, or a drop of a predetermined percentage of fixed-cache occupancy. Still other pacing values include a predetermined percentage of fixed-cache occupancy of write requests for a particular set of storage volumes 202, a predetermined percentage of fixed-cache occupancy of write requests having a particular priority, a predetermined percentage of fixed-cache occupancy of write requests from a particular set of applications 206, and the like.

The assignment module 308 may assign a pacing value to a write request based on a mapping between a set of pacing values and a set of priorities. The assignment module 308 may maintain the mapping in a data structure such as a file, object, variable, list, and the like or the assignment module 308 may receive the mapping through an API, variable, function call, and the like. The mapping may be hard coded or may be user configurable.

Figure 5A:
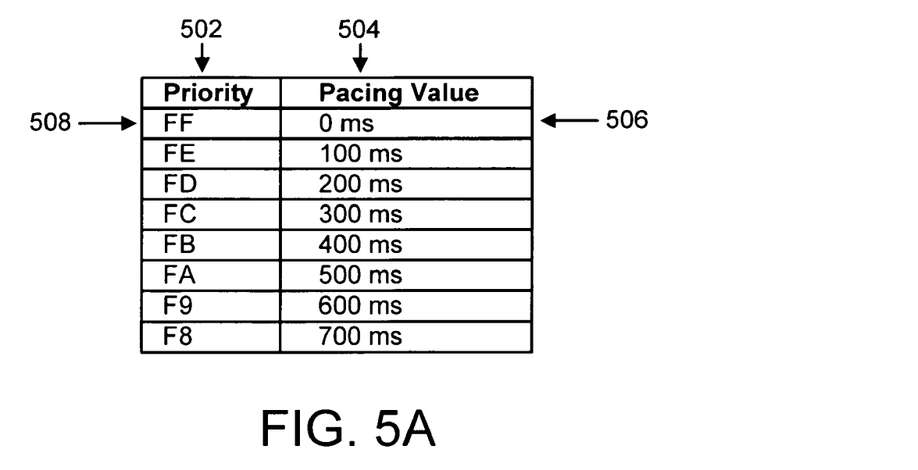
FIG. 5A is a chart illustrating an example mapping between a set of priorities and a set of pacing values in accordance with the present invention.

FIG. 5A is a chart illustrating one embodiment of a mapping 500 between a set of priorities 502 and a set of pacing values 504. In this embodiment, the pacing value is an amount of time. However, in other embodiments, the pacing value could be a percentage of cache occupancy, a number of CPU cycles, or one of the other types of pacing values described above. In this embodiment, the assignment module 308 assigns each priority a unique pacing value so that there is a one-to-one correspondence between the set of priorities 502 and the set of pacing values 504.

For example, priority "FF" 508 is mapped to a pacing value of "0 ms" 506. Since the pacing value in this example is a specified amount of time in milliseconds, a pacing value of "0 ms" 506 introduces no delay, effectively disabling pacing for write requests having priority "FF" 508. Disabling pacing for certain write requests is desirable since it allows high priority write requests to be processed without delay while lower priority write requests are delayed so that they do not interfere with high priority write requests.

Figure 5B:
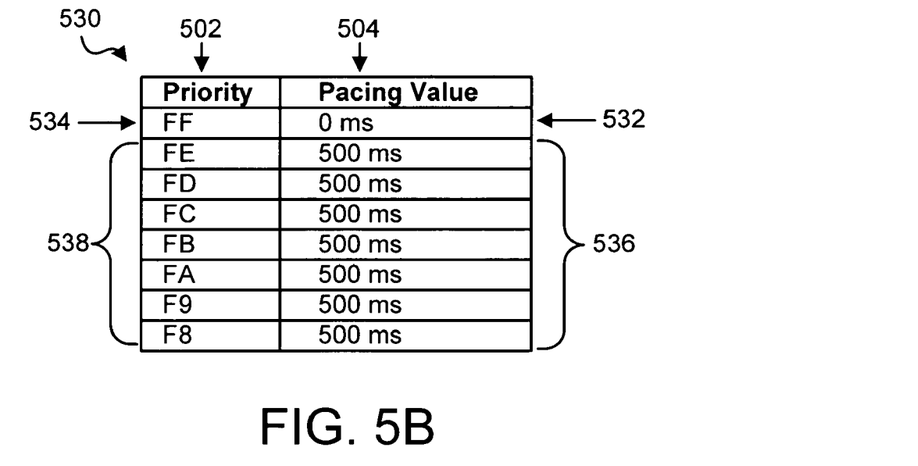
FIG. 5B is a chart illustrating an example mapping between a set of priorities and a set of pacing values in accordance with the present invention.

FIG. 5B is a chart illustrating another embodiment of a mapping 530 between a set of priorities 502 and a set of pacing values 504. In this embodiment, the assignment module 308 assigns a first pacing value 532 to a write request with a first priority 534 and assigns a second pacing value 536 to a write requests having a priority 538 other than the first priority 534. As in FIG. 5A above, the embodiment illustrated in FIG. 5B illustrates an amount of time as a pacing value. However, the pacing value could be of one of the other types described above.

Figure 5C:
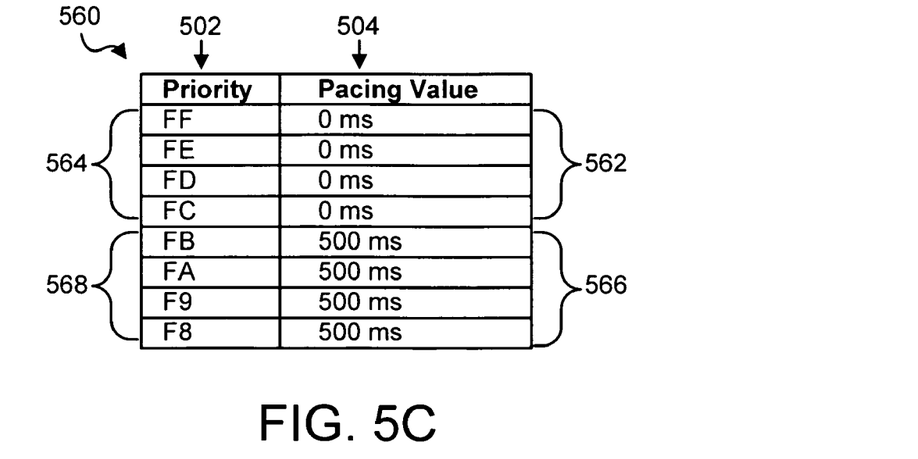
FIG. 5C is a chart illustrating an example mapping between a set of priorities and a set of pacing values in accordance with the present invention.

FIG. 5C is a chart illustrating yet another embodiment of a mapping 560 between a set of priorities 502 and a set of pacing values 504. In this embodiment, the assignment module 308 assigns a first pacing value 562 to a write request having one of a first plurality of priorities 564 and assigns a second pacing value 566 to a write requests having one of a second plurality of priorities 568 resulting in a many-to-one mapping. Although FIG. 5C illustrates two pluralities of priorities 564, 568, additional pluralities of priorities may be mapped to pacing values. As in FIG. 5A above, the embodiment illustrated in FIG. 5C illustrates an amount of time as a pacing value. However, the pacing value could be one of the other types described above.

Returning now to FIG. 3, the permission module 310 permits the application 206 to issue a subsequent write request once the pacing value associated with the original request has been satisfied. The permission module 310 determines when the pacing value has been satisfied. The permission module 310 may make this determination by periodically checking to see if the pacing value is satisfied. Alternatively, the permission module 310 may utilize a mechanism that provides notification to the permission module 310 once the pacing value has been satisfied. The permission module 310 may use other methods well known to those of skill in the art to determine when the pacing value has been satisfied.

In one embodiment, the permission module 310 and the application 206 communicate in such a manner that the application 206 does not issue a subsequent write request until the permission module 310 has acknowledged an original write request. In this embodiment, the permission module 310 waits to send acknowledgement of the original write request until after the pacing value has been satisfied. Since the application 206 will not issue a subsequent write request until the application 206 receives acknowledgement, the permission module 310 effectively reduces the rate at which the application 206 may add write requests to the fixed-size cache 204 by withholding acknowledgement until the pacing value has been satisfied. This rate reduction regulates the number of write requests in the fixed-size cache 204.

If the storage demand level is below (or in some embodiments equal to or below) the threshold, the assignment module 308 may not assign a pacing value and thus the permission module 310 will not delay acknowledgment of write requests. As demand for slots within the fixed-size cache 204 increases, the storage demand level will eventually rise above the threshold and the permission module 310 will begin delaying acknowledgments, thus slowing down the number of write requests entering the cache. Simultaneously, the write requests in the cache will be executed and removed from the fixed-size cache making room for new write requests. Eventually, if write requests are executed at a rate greater than the rate at which write requests are added to the cache, the storage demand level will fall below the storage demand level threshold and the permission module will no longer delay acknowledgments.

Of course, other methods may be used to permit subsequent write requests once the pacing value of the original write request has been satisfied. For example, a token approach could be used such that the application 206 may issue a write request if the application 206 has possession of a token. The permission module 310 would take possession of the token once the application 206 issues a write request and would not give up the token until the pacing value associated with the write request has been satisfied. The permission module 310 may employ other similar techniques for permitting subsequent write requests well know to those of skill in the art.

Figure 6:
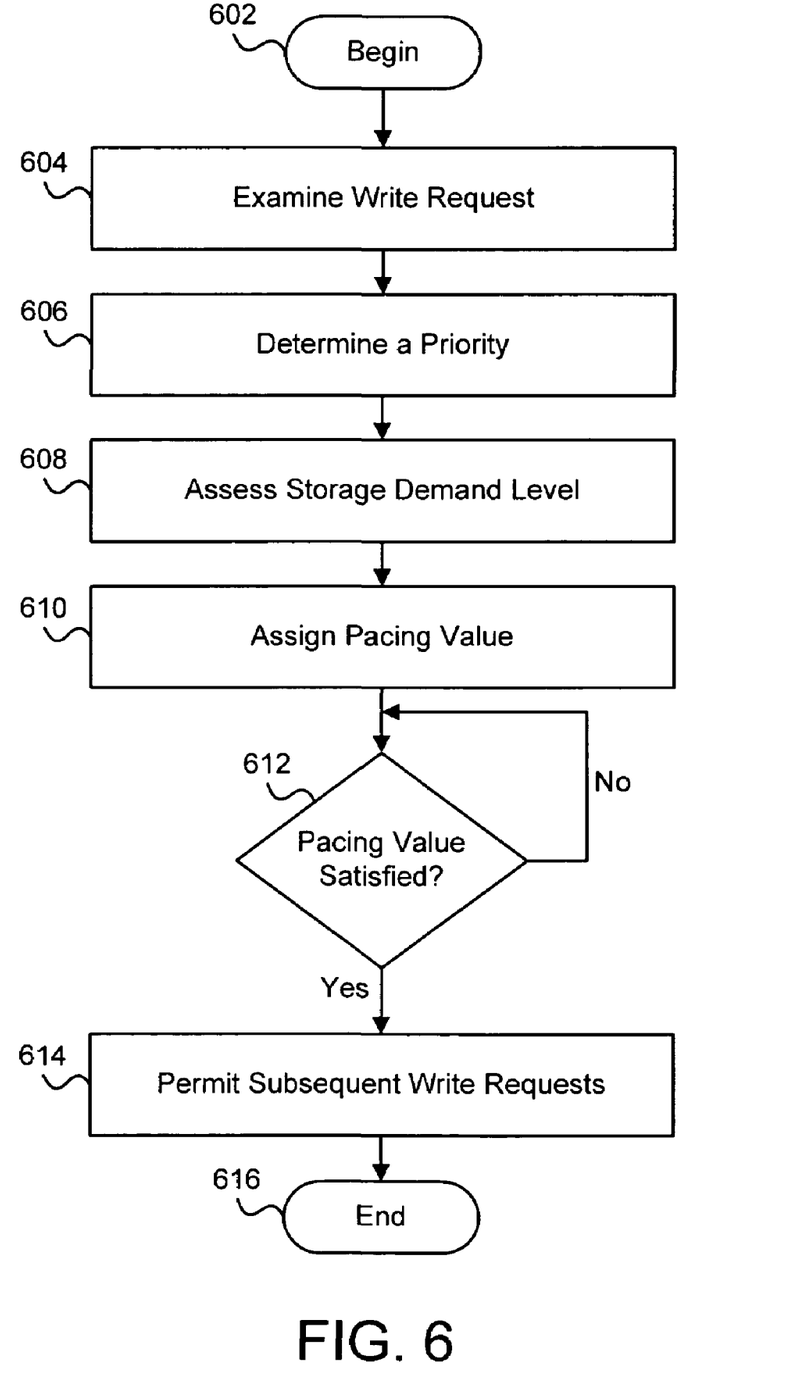
FIG. 6 is a flow chart diagram illustrating one embodiment of a method for regulating the number of write requests in a fixed-size cache in accordance with the present invention.

FIG. 6 is flow chart diagram illustrating one embodiment of a method 600 for regulating the number of write requests in a fixed-size cache 204. Preferably, the method 600 can be implemented in a conventional system by modifying computer readable code to implement the storage controller 208 described above. The method 600 begins 602 when the examination module 302 examines 604 a write request issued by an application 206.

Next, the priority module 304 determines 606 a priority for the write request. As discussed above, the priority module 304 determines a priority based on a characteristic of the write request, such as an input/output priority value defined by an operating system. Next, the assessment module 306 assesses 608 the storage demand level for the fixed-size cache 204. The assessment module 306 may use the techniques described above to determine whether demand for slots in the fixed-size cache 204 is above, below, or equal to a threshold. If the demand is above (or in some embodiments equal to) the threshold, the assignment module 308 assigns 610 a pacing value to the write request. The pacing value may be an amount of time or one of the other types of pacing values described above.

Next, the permission module 310 determines 612 if the pacing value has been satisfied. If the pacing value has been satisfied, the permission module 310 permits 614 the application 206 to issue subsequent write requests and the method ends 616. If the pacing value is not satisfied then the permission module 310 withholds permission to issue subsequent write requests from the application 206 until the pacing value has been satisfied.

A method for deploying computing infrastructure, comprising integrating computer readable code into a computing system uses the apparatus 300 to regulate the number of write requests in a fixed-size cache 204.

The present invention regulates the number of write requests in a fixed-size cache 204 by reducing the rate at which an application 206 may consume slots within a fixed-size cache 204. The present invention reduces fixed-size cache 204 overflows and delays in high priority write operations by regulating the number of write requests in the fixed-size cache 204 so that there will be room for high priority write requests. In addition, the present invention assigns a pacing value based on a per write request basis providing fine granularity. The present invention also allows pacing values to be assigned based on the destination storage volume of the write request.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as data value programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

What is claimed is:

1. A program of machine-readable instructions stored on a storage controller and executable by the storage controller to perform operations to regulate a number of write requests in a fixed-size cache, the program configured to perform:
    an operation to determine a priority for a write request generated by an application based on a characteristic of the write request, wherein the characteristic is a service level agreement identifier;
    an operation to assess a storage demand level for storing write requests in a fixed-size cache;
    an operation to assign a pacing value to the write request based on the priority in response to the storage demand level, the pacing value comprising an amount of time; and
    an operation to not permit a subsequent write request by the application before the amount of time of the pacing value expires and the storage controller acknowledges the write request and permit the subsequent write request when the amount of time of the pacing value expires and the storage controller acknowledges the write request.

2. The program of claim 1, wherein the pacing value amount of time is between zero milliseconds and five seconds.

3. The program of claim 1, wherein the operation to assess a storage demand level further comprises comparing a rate of write requests received to a threshold.

4. The program of claim 1, wherein the operation to assess a storage demand level further comprises comparing a count of write requests associated with a set of storage volumes stored in the fixed-size cache with a threshold.

5. The program of claim 1, wherein the operation to assign further comprises assigning a first pacing value to a write request with a first priority and assigning a second pacing value to a write request with a priority different from the first priority.

6. The program of claim 1, wherein the operation to assign further comprises assigning the pacing value to the write request based on a one-to-one correspondence between a set of priorities and a set of pacing values.

7. A system for regulating a number of write requests in a fixed-size cache, the system comprising:
    a fixed-size cache;
    an application;
    at least one storage volume;
    a storage controller comprising;
    an examination module configured to examine a write request generated by the application;
    a priority module configured to determine a priority for the write request based on a characteristic of the write request, wherein the characteristic is a service level agreement identifier;
    an assessment module configured to assess a storage demand level for storing write requests in the fixed-size cache;
    an assignment module configured to assign a pacing value to the write request based on the priority in response to the storage demand level, the pacing value comprising an amount of time;
    a permission module configured to not permit a subsequent write request by the application before the amount of time of the pacing value expires and the storage controller acknowledges the write request and permit the subsequent write request when the amount of time of the pacing value expires and the storage controller acknowledges the write request;
    a first communication bus configured to facilitate communication between the fixed-size cache and the storage volume; and
    a second communication bus configured to facilitate communication between the application, storage controller, and fixed-size cache.

8. The system of claim 7, wherein the pacing value comprises an amount of time between zero milliseconds and five seconds.

9. The system of claim 7, wherein the assessment module is further configured to compare a rate of write requests received to a threshold.

10. The system of claim 7, wherein the assignment module is further configured to assign a first pacing value to a write request with a first priority and assign a second pacing value to a write request with a priority different from the first priority.

11. An apparatus for assigning a pacing value to a write request, the apparatus comprising:

an examination module configured to read an operating system defined input/output priority value associated with a write request generated by an application, wherein the input/output priority value is a service level agreement identifier;

a priority module configured to determine a priority for the write request based on the input/output priority value of the write request;

an assessment module configured to assess a storage demand level for storing write requests in a fixed-size cache by comparing a count of write requests associated with a set of storage volumes stored in the fixed-size cache with a threshold;

an assignment module configured to assign a pacing value to the write request based on the priority in response to the storage demand level wherein the pacing value comprises an amount of time between zero milliseconds and five seconds; and a permission module configured to not permit a subsequent write request by the application before the amount of time of the pacing value expires and a storage controller acknowledges the write request and permit the subsequent write request when the amount of time of the pacing value expires and the storage controller acknowledges the write request.

12. The apparatus of claim 11, wherein the assignment module is further configured to assign a first pacing value to a write request with a first priority and assign a second pacing value to a write request with a priority different from the first priority.

13. The apparatus of claim 11, wherein the assignment module is further configured to assign the pacing value to the write request based on a one-to-one correspondence between a set of priorities and a set of pacing values.

14. A method for regulating a number of write requests by deploying computing infrastructure, comprising integrating computer readable code into a computing system, wherein the code in combination with the computing system is capable of regulating the number of write requests in a fixed-size cache, the method of the computer readable code comprising:

examining a write request generated by an application;

determining a priority for the write request based on a characteristic of the write request, wherein the characteristic is a service level agreement identifier;

assessing a storage demand level for storing write requests in a fixed-size cache;

assigning a pacing value to the write request based on the priority in response to the storage demand level, the pacing value comprising an amount of time;

not permitting a subsequent write request by the application before the amount of time of the pacing value expires and a storage controller acknowledges the write request; and permitting the subsequent write request when the amount of time of the pacing value expires and the storage controller acknowledges the write request.

15. The method of claim 14, wherein assessing a storage demand level further comprises comparing a count of write requests associated with a set of storage volumes stored in the fixed-size cache with a threshold.

16. The method of claim 14, wherein assigning further comprises assigning the pacing value to the write request based on a one-to-one correspondence between a set of priorities and a set of pacing values.

* * * * *